(12) United States Patent
Wang

(10) Patent No.: US 9,916,024 B2
(45) Date of Patent: Mar. 13, 2018

(54) TOUCH DISPLAY DEVICE WITH TACTILE FEEDBACK FUNCTION AND DRIVING METHOD THEREOF

(71) Applicant: Wuhan China Star Optoelectronics Technology Co., Ltd., Wuhan (CN)

(72) Inventor: Chao Wang, Wuhan (CA)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 241 days.

(21) Appl. No.: 15/023,693

(22) PCT Filed: Jan. 29, 2016

(86) PCT No.: PCT/CN2016/072848
§ 371 (c)(1),
(2) Date: Mar. 22, 2016

(87) PCT Pub. No.: WO2017/107293
PCT Pub. Date: Jun. 29, 2017

(65) Prior Publication Data
US 2018/0011572 A1    Jan. 11, 2018

(30) Foreign Application Priority Data
Dec. 22, 2015 (CN) .......................... 2015 1 0989190

(51) Int. Cl.
*G06F 3/041* (2006.01)
*G06F 3/044* (2006.01)
*G02F 1/1343* (2006.01)
*G06F 3/01* (2006.01)
*G02F 1/1333* (2006.01)

(52) U.S. Cl.
CPC .......... *G06F 3/0412* (2013.01); *G02F 1/1343* (2013.01); *G02F 1/13338* (2013.01); *G06F 3/016* (2013.01); *G06F 3/044* (2013.01); *G06F 3/0414* (2013.01); *G06F 2203/014* (2013.01)

(58) Field of Classification Search
CPC ..................................................... G06F 3/044
See application file for complete search history.

(56) References Cited

U.S. PATENT DOCUMENTS 9,501,145 B2 * 11/2016 Poupyrev ................ G06F 3/045
9,569,055 B2 *  2/2017 Post ........................ G06F 3/046
(Continued)

*Primary Examiner* — Patrick F Marinelli
(74) *Attorney, Agent, or Firm* — Leong C. Lei

(57) ABSTRACT

Disclosed is a touch display device with tactile feedback function, including a first substrate (10), a second substrate (20), a liquid crystal layer (30), a patterned conductive layer (50) and an insulation layer (40); the patterned conductive layer (50) comprises a plurality of first signal lines (1) which are separately arranged in parallel and extended along a horizontal direction, and a plurality of second signal lines (2) which are separately arranged in parallel, and extended along a vertical direction, and insulated with the first signal lines (1); a side of the second substrate (20) close to the liquid crystal layer (30) includes a plurality of third signal lines (3) which are separately arranged in parallel along the vertical direction; the touch scan is achieved with the first and the third signal lines (1, 3), and the tactile feedback is achieved with the first and the second signal lines (1, 2).

16 Claims, 4 Drawing Sheets

(56) References Cited

U.S. PATENT DOCUMENTS

| | | | | |
|---|---|---|---|---|
| 9,733,746 B2* | 8/2017 | Colgate | | G06F 3/016 |
| 9,804,724 B2* | 10/2017 | Colgate | | G06F 3/016 |
| 2008/0218488 A1* | 9/2008 | Yang | | G09G 3/20 |
| | | | | 345/173 |
| 2011/0285667 A1* | 11/2011 | Poupyrev | | G06F 3/016 |
| | | | | 345/174 |
| 2012/0287068 A1* | 11/2012 | Colgate | | G06F 3/016 |
| | | | | 345/173 |
| 2012/0326999 A1* | 12/2012 | Colgate | | G06F 3/016 |
| | | | | 345/173 |
| 2012/0327006 A1* | 12/2012 | Israr | | G06F 3/016 |
| | | | | 345/173 |
| 2014/0192005 A1* | 7/2014 | Wakuda | | G06F 3/041 |
| | | | | 345/173 |
| 2014/0266649 A1* | 9/2014 | Wakuda | | G06F 3/041 |
| | | | | 340/407.2 |
| 2014/0340210 A1* | 11/2014 | Wakuda | | G06F 3/041 |
| | | | | 340/407.2 |
| 2014/0375580 A1* | 12/2014 | Peshkin | | G06F 3/016 |
| | | | | 345/173 |
| 2015/0048846 A1* | 2/2015 | Post | | G06F 3/046 |
| | | | | 324/663 |
| 2015/0049034 A1* | 2/2015 | Post | | G06F 3/046 |
| | | | | 345/173 |
| 2015/0049055 A1* | 2/2015 | Post | | G06F 3/046 |
| | | | | 345/174 |
| 2015/0049056 A1* | 2/2015 | Post | | G06F 3/046 |
| | | | | 345/174 |
| 2015/0301673 A1* | 10/2015 | Peshkin | | G06F 3/016 |
| | | | | 345/174 |
| 2015/0355714 A1* | 12/2015 | Colgate | | G06F 3/016 |
| | | | | 345/173 |
| 2016/0062537 A1* | 3/2016 | Kim | | G06F 3/0416 |
| | | | | 345/174 |
| 2016/0216794 A1* | 7/2016 | Yoon | | G06F 3/041 |
| 2016/0282944 A1* | 9/2016 | Haga | | G06F 3/016 |
| 2016/0357342 A1* | 12/2016 | Olley | | G06F 3/044 |
| 2017/0168572 A1* | 6/2017 | Peshkin | | G06F 3/016 |

* cited by examiner

TOUCH DISPLAY DEVICE WITH TACTILE FEEDBACK FUNCTION AND DRIVING METHOD THEREOF

FIELD OF THE INVENTION

The present invention relates to a display technology field, and more particularly to a touch display device with tactile feedback function and a driving method thereof.

BACKGROUND OF THE INVENTION

The LCD (Liquid Crystal Display) possesses many advantages of being ultra thin, power saved and radiation free. It has been widely utilized in, such as LCD TVs, mobile phones, Personal Digital Assistant (PDAs), digital cameras, laptop screens or notebook screens.

With the development of the liquid crystal display technology, people have more demands for the display quality, appearance design, and human machine interface of the liquid crystal display. The touch technology has properties of convenient operation and high integration, and thus becomes the skill development hot spot. The touch technology has been developed rapidly in the recent years, and at present, there are kinds of touch technologies put into mass productions. For the touch display panels at present, according to the positions of the touch sensor, they can be categorized to be the On Cell which the touch sensors cover on the liquid crystal cells, the In Cell which the touch sensors are embedded in the liquid crystal cells and the Out Cell.

With the development of the tablet display technology and the touch technology, the interactions between the human and the display also constantly increase. The touch control technology is a skill to perform sense and operation with the touch sense of the display surface, which can achieve better interactive experience. The touch control technology utilizes the principle that the different electrostatic forces are generated in different regions of the touch display device surface as the finger touches and slides in the various regions of the touch display device surface, and thus to obtains the different tactile sensations (such as hump or vibration).

The present touch control technology can realize to set the region of realizing the tactile sensation on the touch display device surface. With the program of pre-design, the sensation obtained in some regions of the display image can be different from other regions. Please refer to FIG. 1, which is a principle diagram of a touch display device with tactile feedback function according to prior art. The touch display device with tactile feedback function applies the alternating voltages of frequencies f1 and f2 respectively to the vertical A region and the horizontal B region to make the finger feel the tactile feedback from the C region at the crossing position of the A region and the B region. However, the tactile feedback function for now cannot provide the tactile feedback at arbitrary positions and times.

SUMMARY OF THE INVENTION

An objective of the present invention is to provide a touch display device with tactile feedback function that the tactile feedback can be provided to the finger at the arbitrary position touched by the finger to realize the skeumorphism of the display image to promote the user experience.

Another objective of the present invention is to provide a driving method of a touch display device with tactile feedback function that the positioning the arbitrary position touched by the finger and displaying image can be realized, and the tactile feedback can be provided to the finger to realize the skeumorphism of the display image to promote the user experience.

For achieving the aforesaid objectives, the present invention first provides a touch display device with tactile feedback function, comprising a first substrate, a second substrate oppositely located to the first substrate, and a liquid crystal layer located between the first substrate and the second substrate, a patterned conductive layer at one side of the first substrate away from the liquid crystal layer, and an insulation layer covering the patterned conductive layer;

the patterned conductive layer comprises: a plurality of first signal lines which are separately arranged in parallel and extended along a horizontal direction, and a plurality of second signal lines which are separately arranged in parallel, and extended along a vertical direction, and insulated with the first signal lines;

a side of the second substrate close to the liquid crystal layer comprises a plurality of third signal lines which are separately arranged in parallel along the vertical direction;

as performing touch scan, the plurality of first signal lines and the plurality of third signal lines are respectively employed to be touch driving electrodes and touch sensing electrodes to construct a touch unit, and the touch unit positions a position touched by a finger to achieve touch function;

as performing tactile feedback, two alternating voltages of different frequencies are respectively applied to the first signal line and the second signal line corresponding to the position touched by the finger, and with difference frequency phenomenon, an electrostatic force is released at the position touched by the finger to achieve the tactile feedback.

The first substrate is an array substrate and the second substrate is a color filter substrate.

The plurality of third signal lines are common electrode lines.

The touch display device further comprises a touch control chip, and the plurality of third signal lines are electrically coupled to the touch control chip.

Both materials of the plurality of first signal lines and material of the plurality of second signal lines are Indium Tin Oxide.

As performing touch scan, the plurality of second signal lines are grounded; as performing tactile feedback, the third signal lines are electrically coupled to a common voltage signal.

As performing tactile feedback, a range of the alternating voltages applied to the first signal line and the second signal line is 100-5000 Hz, and the frequency of the alternating voltage applied to the first signal line and the frequency of the alternating voltage applied to the second signal line are different.

The plurality of first signal lines are disconnected in interval by the plurality of second signal lines, and the disconnected first signal lines are electrically coupled with a plurality of bridge metal lines crossing the second signal lines.

The plurality of second signal lines are disconnected in interval by the plurality of first signal lines, and the disconnected second signal lines are electrically coupled with a plurality of bridge metal lines crossing the first signal lines.

The present invention further provides a driving method of a touch display device with tactile feedback function, comprising steps of:

step 1, providing a touch display device with tactile feedback function, and the touch display device with tactile feedback function comprises a first substrate, a second substrate oppositely located to the first substrate, and a liquid crystal layer located between the first substrate and the second substrate, a patterned conductive layer at one side of the first substrate away from the liquid crystal layer, and an insulation layer covering the patterned conductive layer;

the patterned conductive layer comprises: a plurality of first signal lines which are separately arranged in parallel and extended along a horizontal direction, and a plurality of second signal lines which are separately arranged in parallel, and extended along a vertical direction, and insulated with the first signal lines;

a side of the second substrate close to the liquid crystal layer comprises a plurality of third signal lines which are separately arranged in parallel along the vertical direction;

step 2, employing the plurality of first signal lines and the plurality of third signal lines respectively to be touch driving electrodes and touch sensing electrodes to construct a touch unit, and the touch unit is activated and the touch display device with tactile feedback function enters a touch scan stage;

step 3, touching a position on a surface of the touch display device with tactile feedback function with a finger, and positioning the position touched by the finger with the touch unit, and then deactivating the touch unit to accomplish touch scan;

step 4, respectively applying two alternating voltages of different frequencies to the first signal line and the second signal line corresponding to the position touched by the finger and positioned in the step 3, and with difference frequency phenomenon, an electrostatic force is released at the position touched by the finger to accomplish the tactile feedback.

The present invention further provides a touch display device with tactile feedback function, comprising a first substrate, a second substrate oppositely located to the first substrate, and a liquid crystal layer located between the first substrate and the second substrate, a patterned conductive layer at one side of the first substrate away from the liquid crystal layer, and an insulation layer covering the patterned conductive layer;

the patterned conductive layer comprises: a plurality of first signal lines which are separately arranged in parallel and extended along a horizontal direction, and a plurality of second signal lines which are separately arranged in parallel, and extended along a vertical direction, and insulated with the first signal lines;

a side of the second substrate close to the liquid crystal layer comprises a plurality of third signal lines which are separately arranged in parallel along the vertical direction;

as performing touch scan, the plurality of first signal lines and the plurality of third signal lines are respectively employed to be touch driving electrodes and touch sensing electrodes to construct a touch unit, and the touch unit positions a position touched by a finger to achieve touch function;

as performing tactile feedback, two alternating voltages of different frequencies are respectively applied to the first signal line and the second signal line corresponding to the position touched by the finger, and with difference frequency phenomenon, an electrostatic force is released at the position touched by the finger to achieve the tactile feedback;

wherein the first substrate is an array substrate and the second substrate is a color filter;

wherein the plurality of third signal lines are common electrode lines;

the touch display device further comprises a touch control chip, and the plurality of third signal lines are electrically coupled to the touch control chip.

The benefits of the present invention are: in the touch display device with tactile feedback function and a driving method thereof, the patterned conductive layer, comprising a plurality of first signal lines which are separately arranged in parallel and extended along a horizontal direction, and a plurality of second signal lines which are separately arranged in parallel, and extended along a vertical direction, and insulated with the first signal lines is located at one side of the first substrate of the touch display device with tactile feedback function away from the liquid crystal layer, and a plurality of third signal lines which are separately arranged in parallel along the vertical direction are located on the second substrate; as functioning, the touch scan and the tactile feedback are respectively performed. As performing touch scan, the plurality of first signal lines and the plurality of third signal lines are respectively employed to be touch driving electrodes and touch sensing electrodes to construct a touch unit, and the touch unit positions a position touched by a finger to achieve touch function, and after the touch scan is accomplished, the tactile feedback is performed, and two alternating voltages of different frequencies are respectively applied to the first signal line and the second signal line corresponding to the position touched by the finger, and with difference frequency phenomenon, an electrostatic force is released at the position touched by the finger to accomplish the tactile feedback. With the mutual combination design of the touch and sense, the interactive experience from touch to sense is realized, and the tactile feedback can be provided to the finger at the arbitrary position touched by the finger to significantly promote the user experience.

BRIEF DESCRIPTION OF THE DRAWINGS

In order to better understand the characteristics and technical aspect of the invention, please refer to the following detailed description of the present invention is concerned with the diagrams, however, provide reference to the accompanying drawings and description only and is not intended to be limiting of the invention.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
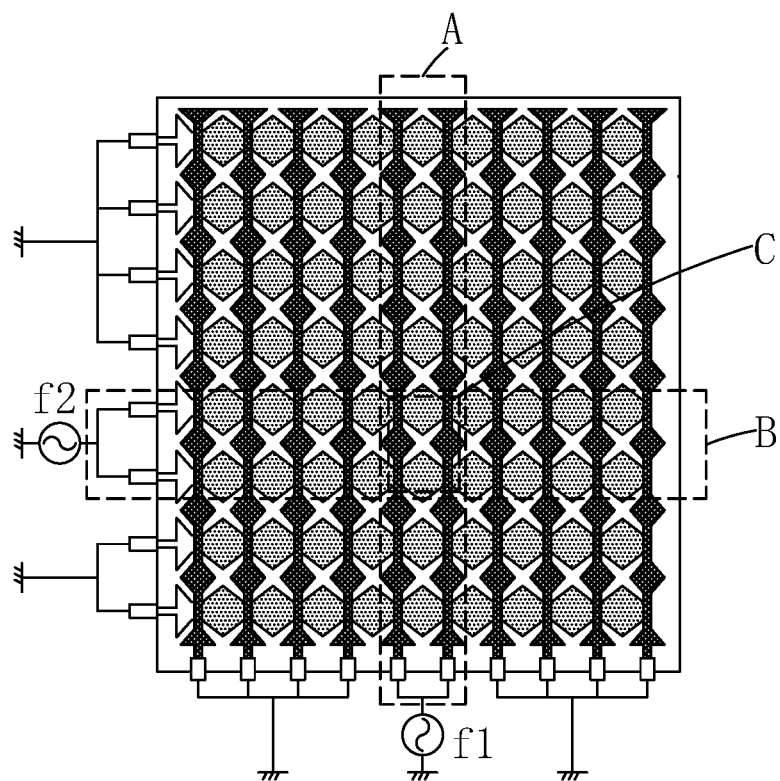
FIG. 1 is a principle diagram of a touch display device with tactile feedback function according to prior art.
Figure 2:
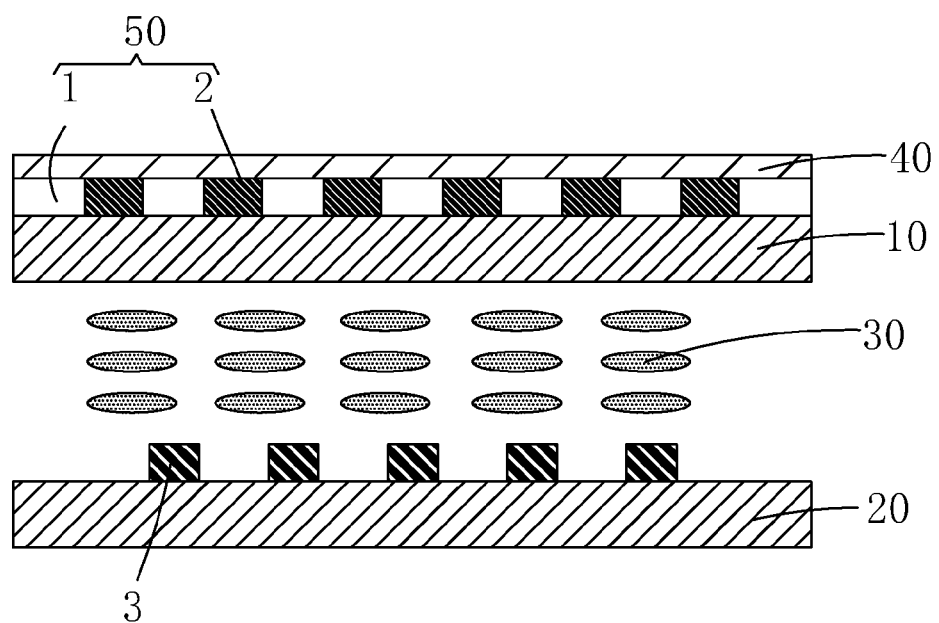
FIG. 2 is a sectional diagram of a touch display device with tactile feedback function of the present invention.
Figure 3:
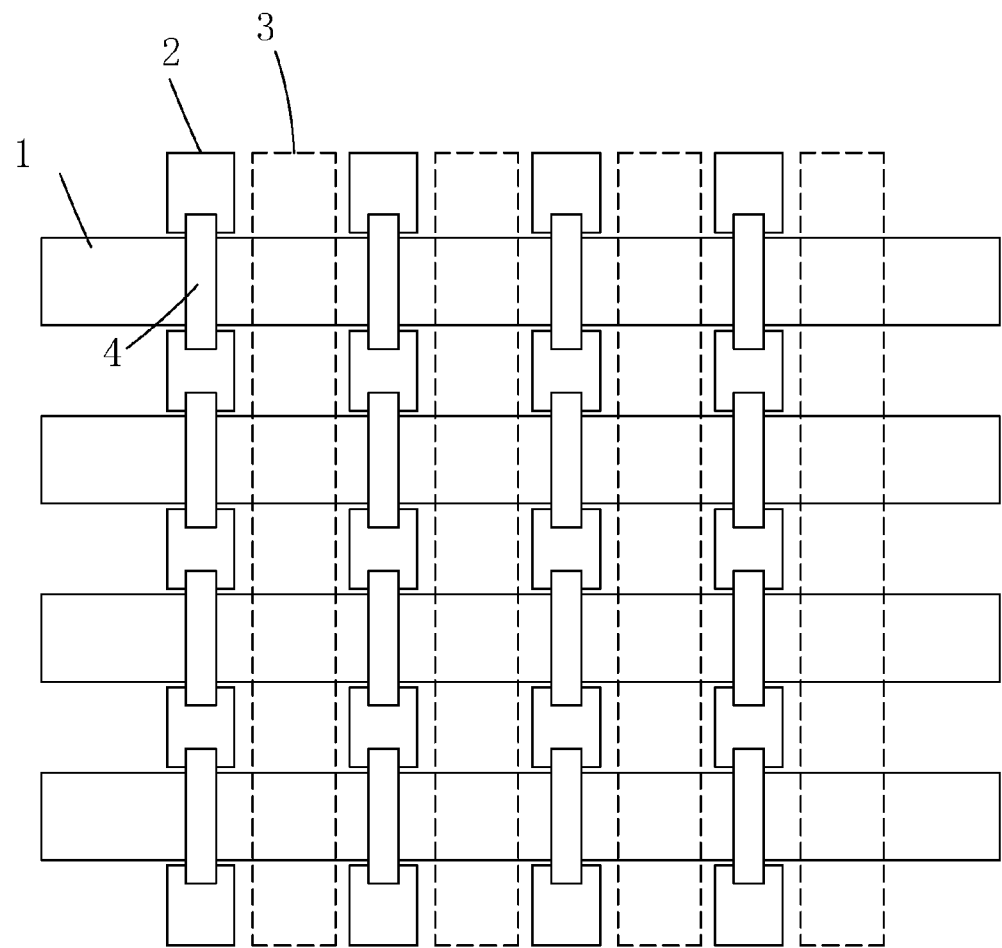
FIG. 3 is a layout top view diagram of the first to third signal lines of the touch display device with tactile feedback function of the present invention.

Please refer to FIG. 2 and FIG. 3. The present invention first provides a touch display device with tactile feedback function, comprising a first substrate 10, a second substrate 20 oppositely located to the first substrate 10, and a liquid crystal layer 30 located between the first substrate 10 and the second substrate 20, a patterned conductive layer 50 at one side of the first substrate 10 away from the liquid crystal layer 30, and an insulation layer 40 covering the patterned conductive layer 50.

The patterned conductive layer 50 comprises a plurality of first signal lines 1 which are separately arranged in parallel and extended along a horizontal direction, and a plurality of second signal lines 2 which are separately arranged in parallel, and extended along a vertical direction, and insulated with the first signal lines 1.

A side of the second substrate 20 close to the liquid crystal layer 30 comprises a plurality of third signal lines 3 which are separately arranged in parallel along the vertical direction.

Specifically, the touch display device with tactile feedback function performs touch scan and tactile feedback, respectively. As performing touch scan, the plurality of first signal lines 1 and the plurality of third signal lines 3 are respectively employed to be touch driving electrodes and touch sensing electrodes to construct a touch unit, and the touch unit positions a position touched by a finger to achieve touch function; as performing tactile feedback, two alternating voltages of different frequencies are respectively applied to the first signal line 1 and the second signal line 2 corresponding to the position touched by the finger, and with difference frequency phenomenon, an electrostatic force is released at the position touched by the finger to achieve the tactile feedback.

Furthermore, the touch display device with tactile feedback function further comprises a touch control chip, and the plurality of third signal lines 3 are electrically coupled to the touch control chip. The frequency difference phenomenon means that as the frequencies of the alternating voltages of the first signal line 1 and the second signal line 2 are different, the cross point (the connection region of the bridge metal line 4) of the first signal line 1 and the second signal line 2 will generate the difference frequency of which the frequency is equal to the difference frequency of the difference value of the alternating voltages applied to the first signal line 1 and the second signal line 2. The difference frequency will cause the change of the transverse friction, which can make the finger fell the various friction resisting forces in real time for achieving the tactile feedback.

Specifically, the first substrate 10 and the second substrate 20 respectively are an array substrate and a color filter substrate.

Specifically, for promoting the touch sensibility, the thickness of the insulation layer 40 should be decreased as possible to promote the capacitance formed after the finger touched.

Specifically, the plurality of third signal lines 3 can be located on the surface of the second substrate 20, or can be shared with the common electrode lines.

Specifically, both material of the plurality of first signal lines 1 and material of the plurality of second signal lines 3 are Indium Tin Oxide (ITO).

Specifically, as performing touch scan, the plurality of second signal lines 2 are grounded to promote the touch sensibility. As performing tactile feedback, the plurality of third signal lines 3 are electrically coupled to a common voltage signal for preventing the influence due to the result of the tactile feedback while normally showing the images.

Specifically, as performing tactile feedback, both the ranges of the alternating voltages applied to the first signal line 1 and the second signal line 2 are 100-5000 Hz, and the frequency of the alternating voltage applied to the first signal line 1 and the frequency of the alternating voltage applied to the second signal line 2 are different.

Particularly, referring to FIG. 3, the horizontal first signal lines 1 and the vertical second signal lines 2 exist in the conductive layer 50 at the same time. For insulating the first signal lines 1 from the second signal lines 2, the plurality of second signal lines 2 are disconnected in interval by the plurality of first signal lines 1, and the disconnected second signal lines 2 are electrically coupled with a plurality of bridge metal lines 4 crossing the first signal lines 1. Certainly, in other case, the plurality of first signal lines 1 are disconnected in interval by the plurality of second signal lines 2, and the disconnected first signal lines 1 are electrically coupled with a plurality of bridge metal lines crossing the second signal lines 2. Such connection arrangement can effectively promote the contact area of the first and second signal lines 1, 2 at the position touched by the finger to promote the touch sensibility of the finger.

The aforesaid touch display device with tactile feedback function combines the circuit of the touch unit itself. The structure is simple, and the sensibility is high. By utilizing the change of the transverse friction caused by alternating voltages of different frequencies, it can make the finger fell the various friction resisting forces in real time for achieving the tactile feedback to promote the user experience.

Figure 4:
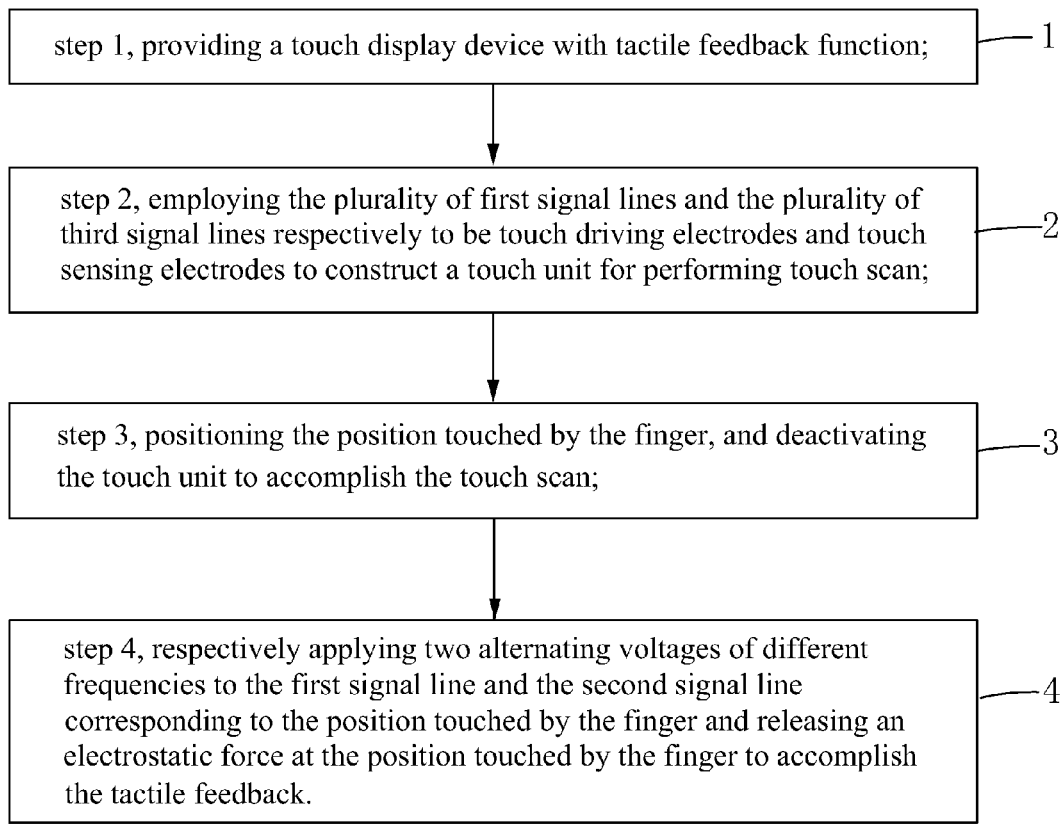
FIG. 4 is a flowchart of a driving method of a touch display device with tactile feedback function of the present invention.

Please refer to FIG. 4 with combination of FIG. 2 to FIG. 3 at the same time. On the basis of the aforesaid touch display device with tactile feedback function, the present invention further provides a driving method of a touch display device with tactile feedback function, comprising steps of:

step 1, providing a touch display device with tactile feedback function, and the touch display device with tactile feedback function comprises a first substrate 10, a second substrate 20 oppositely located to the first substrate 10, and a liquid crystal layer 30 located between the first substrate 10 and the second substrate 20, a patterned conductive layer 50 at one side of the first substrate 10 away from the liquid crystal layer 30, and an insulation layer 40 covering the patterned conductive layer 50.

The patterned conductive layer 50 comprises a plurality of first signal lines 1 which are separately arranged in parallel and extended along a horizontal direction, and a plurality of second signal lines 2 which are separately arranged in parallel, and extended along a vertical direction, and insulated with the first signal lines 1.

A side of the second substrate 20 close to the liquid crystal layer 30 comprises a plurality of third signal lines 3 which are separately arranged in parallel along the vertical direction.

step 2, employing the plurality of first signal lines 1 and the plurality of third signal lines 3 respectively to be touch driving electrodes and touch sensing electrodes to construct a touch unit, and the touch unit is activated and the touch display device with tactile feedback function enters a touch scan stage.

In the process of the step 2, the plurality of second signal lines 2 are grounded to promote the touch sensibility.

step 3, touching a position on a surface of the touch display device with tactile feedback function with a finger, and positioning the position touched by the finger with the touch unit, and then deactivating the touch unit to accomplish touch scan;

step 4, respectively applying two alternating voltages of different frequencies to the first signal line 1 and the second signal line 2 corresponding to the position touched by the finger and positioned in the step 3, and with difference frequency phenomenon, an electrostatic force is released at the position touched by the finger to accomplish the tactile feedback.

In the step 4, the plurality of third signal lines 3 are electrically coupled to a common voltage signal for preventing the influence due to the result of the tactile feedback.

Particularly, referring to FIG. 3, the horizontal first signal lines 1 and the vertical second signal lines 2 exist in the conductive layer 50 at the same time. For insulating the first signal lines 1 from the second signal lines 2, the plurality of second signal lines 2 are disconnected in interval by the plurality of first signal lines 1, and the disconnected second signal lines 2 are electrically coupled with a plurality of bridge metal lines 4 crossing the first signal lines 1. Certainly, in other case, the plurality of first signal lines 1 are disconnected in interval by the plurality of second signal lines 2, and the disconnected first signal lines 1 are electrically coupled with a plurality of bridge metal lines crossing the second signal lines 2. Such connection arrangement can effectively promote the contact area of the first and second signal lines 1, 2 at the position touched by the finger to promote the touch sensibility of the finger.

In the aforesaid driving method of a touch display device with tactile feedback function, it can be realized that the positioning the arbitrary position touched by the finger and displaying image, and the tactile feedback can be provided to the finger to realize the skeumorphism of the display image to promote the user experience.

Conclusively, in the touch display device with tactile feedback function and a driving method thereof, the patterned conductive layer, comprising a plurality of first signal lines which are separately arranged in parallel and extended along a horizontal direction, and a plurality of second signal lines which are separately arranged in parallel, and extended along a vertical direction, and insulated with the first signal lines is located at one side of the first substrate of the touch display device with tactile feedback function away from the liquid crystal layer, and a plurality of third signal lines which are separately arranged in parallel along the vertical direction are located on the second substrate; as functioning, the touch scan and the tactile feedback are respectively performed. As performing touch scan, the plurality of first signal lines and the plurality of third signal lines are respectively employed to be touch driving electrodes and touch sensing electrodes to construct a touch unit, and the touch unit positions a position touched by a finger to achieve touch function, and after the touch scan is accomplished, the tactile feedback is performed, and two alternating voltages of different frequencies are respectively applied to the first signal line and the second signal line corresponding to the position touched by the finger, and with difference frequency phenomenon, an electrostatic force is released at the position touched by the finger to accomplish the tactile feedback. With the mutual combination design of the touch and sense, the interactive experience from touch to sense is realized, and the tactile feedback can be provided to the finger at the arbitrary position touched by the finger to significantly promote the user experience.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A touch display device with tactile feedback function, comprising a first substrate, a second substrate oppositely located to the first substrate, and a liquid crystal layer located between the first substrate and the second substrate, a patterned conductive layer at one side of the first substrate away from the liquid crystal layer, and an insulation layer covering the patterned conductive layer;

the patterned conductive layer comprises: a plurality of first signal lines which are separately arranged in parallel and extended along a horizontal direction, and a plurality of second signal lines which are separately arranged in parallel, and extended along a vertical direction, and insulated with the first signal lines;

a side of the second substrate close to the liquid crystal layer comprises a plurality of third signal lines which are separately arranged in parallel along the vertical direction;

as performing touch scan, the plurality of first signal lines and the plurality of third signal lines are respectively employed to be touch driving electrodes and touch sensing electrodes to construct a touch unit, and the touch unit positions a position touched by a finger to achieve touch function;

as performing tactile feedback, two alternating voltages of different frequencies are respectively applied to the first signal line and the second signal line corresponding to the position touched by the finger, and with frequency difference phenomenon, an electrostatic force is released at the position touched by the finger to achieve the tactile feedback.

2. The touch display device with tactile feedback function according to claim 1, wherein the first substrate is an array substrate and the second substrate is a color filter substrate.

3. The touch display device with tactile feedback function according to claim 1, wherein the plurality of third signal lines are common electrode lines.

4. The touch display device with tactile feedback function according to claim 1, further comprising a touch control chip, and the plurality of third signal lines are electrically coupled to the touch control chip.

5. The touch display device with tactile feedback function according to claim 1, wherein both material of the plurality of first signal lines and material of the plurality of second signal lines are Indium Tin Oxide.

6. The touch display device with tactile feedback function according to claim 1, wherein as performing touch scan, the plurality of second signal lines are grounded; as performing tactile feedback, the third signal lines are electrically coupled to a common voltage signal.

7. The touch display device with tactile feedback function according to claim 1, wherein as performing tactile feedback, a range of the alternating voltages applied to the first signal line and the second signal line is 100-5000 Hz, and the frequency of the alternating voltage applied to the first signal line and the frequency of the alternating voltage applied to the second signal line are different.

8. The touch display device with tactile feedback function according to claim 1, wherein the plurality of first signal lines are disconnected in interval by the plurality of second signal lines, and the disconnected first signal lines are electrically coupled with a plurality of bridge metal lines crossing the second signal lines.

9. The touch display device with tactile feedback function according to claim 1, wherein the plurality of second signal lines are disconnected in interval by the plurality of first signal lines, and the disconnected second signal lines are electrically coupled with a plurality of bridge metal lines crossing the first signal lines.

10. A driving method of a touch display device with tactile feedback function, comprising steps of:
- step 1, providing a touch display device with tactile feedback function, and the touch display device with tactile feedback function comprises a first substrate, a second substrate oppositely located to the first substrate, and a liquid crystal layer located between the first substrate and the second substrate, a patterned conductive layer at one side of the first substrate away from the liquid crystal layer, and an insulation layer covering the patterned conductive layer;
- the patterned conductive layer comprises: a plurality of first signal lines which are separately arranged in parallel and extended along a horizontal direction, and a plurality of second signal lines which are separately arranged in parallel, and extended along a vertical direction, and insulated with the first signal lines;
- a side of the second substrate close to the liquid crystal layer comprises a plurality of third signal lines which are separately arranged in parallel along the vertical direction;
- step 2, employing the plurality of first signal lines and the plurality of third signal lines respectively to be touch driving electrodes and touch sensing electrodes to construct a touch unit, and the touch unit is activated and the touch display device with tactile feedback function enters a touch scan stage;
- step 3, touching a position on a surface of the touch display device with tactile feedback function with a finger, and positioning the position touched by the finger with the touch unit, and then deactivating the touch unit to accomplish touch scan;
- step 4, respectively applying two alternating voltages of different frequencies to the first signal line and the second signal line corresponding to the position touched by the finger and positioned in the step 3, and with frequency difference phenomenon, an electrostatic force is released at the position touched by the finger to accomplish the tactile feedback.

11. A touch display device with tactile feedback function, comprising a first substrate, a second substrate oppositely located to the first substrate, and a liquid crystal layer located between the first substrate and the second substrate, a patterned conductive layer at one side of the first substrate away from the liquid crystal layer, and an insulation layer covering the patterned conductive layer;
- the patterned conductive layer comprises: a plurality of first signal lines which are separately arranged in parallel and extended along a horizontal direction, and a plurality of second signal lines which are separately arranged in parallel, and extended along a vertical direction, and insulated with the first signal lines;
- a side of the second substrate close to the liquid crystal layer comprises a plurality of third signal lines which are separately arranged in parallel along the vertical direction;
- as performing touch scan, the plurality of first signal lines and the plurality of third signal lines are respectively employed to be touch driving electrodes and touch sensing electrodes to construct a touch unit, and the touch unit positions a position touched by a finger to achieve touch function;
- as performing tactile feedback, two alternating voltages of different frequencies are respectively applied to the first signal line and the second signal line corresponding to the position touched by the finger, and with difference frequency phenomenon, an electrostatic force is released at the position touched by the finger to achieve the tactile feedback;
- wherein the first substrate is an array substrate and the second substrate is a color filter;
- wherein the plurality of third signal lines are common electrode lines;
- the touch display device further comprises a touch control chip, and the plurality of third signal lines are electrically coupled to the touch control chip.

12. The touch display device with tactile feedback function according to claim 11, wherein both material of the plurality of first signal lines and material of the plurality of second signal lines are Indium Tin Oxide.

13. The touch display device with tactile feedback function according to claim 11, wherein as performing touch scan, the plurality of second signal lines are grounded; as performing tactile feedback, the third signal lines are electrically coupled to a common voltage signal.

14. The touch display device with tactile feedback function according to claim 11, wherein as performing tactile feedback, a range of the alternating voltages applied to the first signal line and the second signal line is 100-5000 Hz, and the frequency of the alternating voltage applied to the first signal line and the frequency of the alternating voltage applied to the second signal line are different.

15. The touch display device with tactile feedback function according to claim 11, wherein the plurality of first signal lines are disconnected in interval by the plurality of second signal lines, and the disconnected first signal lines are electrically coupled with a plurality of bridge metal lines crossing the second signal lines.

16. The touch display device with tactile feedback function according to claim 11, wherein the plurality of second signal lines are disconnected in interval by the plurality of first signal lines, and the disconnected second signal lines are electrically coupled with a plurality of bridge metal lines crossing the first signal lines.

* * * * *